(12) United States Patent
Suzuki et al.

(10) Patent No.: US 11,112,561 B2
(45) Date of Patent: Sep. 7, 2021

(54) VARIABLE WAVELENGTH FILTER

(71) Applicant: Nippon Telegraph and Telephone Corporation, Tokyo (JP)

(72) Inventors: Kenya Suzuki, Musashino (JP); Takashi Go, Musashino (JP); Osamu Moriwaki, Musashino (JP); Ai Yanagihara, Musashino (JP); Keita Yamaguchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/970,270

(22) PCT Filed: Mar. 4, 2019

(86) PCT No.: PCT/JP2019/008281
§ 371 (c)(1),
(2) Date: Aug. 14, 2020

(87) PCT Pub. No.: WO2019/172158
PCT Pub. Date: Sep. 12, 2019

(65) Prior Publication Data
US 2021/0141153 A1  May 13, 2021

(30) Foreign Application Priority Data
Mar. 7, 2018 (JP) .............. JP2018-041139

(51) Int. Cl.
*G02B 6/12* (2006.01)
*G02B 6/293* (2006.01)
*G02F 1/01* (2006.01)

(52) U.S. Cl.
CPC ..... *G02B 6/12014* (2013.01); *G02B 6/12009* (2013.01); *G02B 6/29325* (2013.01)

(58) Field of Classification Search
CPC .. G02B 6/12014; G02B 6/29325; G02B 6/12; G02B 6/12009; G02F 1/01
See application file for complete search history.

(56) References Cited

U.S. PATENT DOCUMENTS

| 6,278,813 | B1 | 8/2001 | Takada et al. |
| 2006/0198579 | A1 | 9/2006 | Bulthuis et al. |
| 2013/0243432 | A1 | 9/2013 | McGreer |

FOREIGN PATENT DOCUMENTS

| JP | 2008-532094 A | 8/2008 |
| JP | 2010-54620 A | 3/2010 |
| JP | 2000-111751 A | 4/2020 |

OTHER PUBLICATIONS

Optoplex Corporation, *Optical Channel Monitor*, Web Literature, Dec. 5, 2017 (reading day), http://www.optoplex.com/Optical_channel_Monitor.htm, pp. 2.

(Continued)

*Primary Examiner* — Ryan A Lepisto
*Assistant Examiner* — Erin D Chiem
(74) *Attorney, Agent, or Firm* — Workman Nydegger (57) ABSTRACT

Provided is a variable wavelength filter having a wide variable wavelength range. In the variable wavelength filter, a slab waveguide that is a component of an arrayed-waveguide grating has a groove into which a resin is inserted. The groove intersects with a plurality of line segments A joining a place of connection between an input light waveguide and the slab waveguide to places of connection between respective array waveguides and the slab waveguide. The groove is formed such that a total length LA of an intersection of the groove and each of the line segments A monotonously increases or decreases between the adjacent line segments A with a difference in the total length LA between the adjacent line segments A being constant.

11 Claims, 7 Drawing Sheets

(56) References Cited

OTHER PUBLICATIONS

NTT Electronic Corporation, *Optical Channel Monitor OCM*, Web Literature, Dec. 5, 2017 (reading day), http://www.ntt-electronics.com/product/photonics/opt_c_m_ocm.html, pp. 2.

Takaharu Oyama, *Transmission Wavelength Variable AWG for Optical Channel Monitor, Wavelength Tunable AWG for Optical Channel Monitor*, 2008 Electronics Conference of the Institute of Electronics, Information and Communication Engineering of Japan, Sep. 16, 2008, p. 201.

Arata Kamei, *Study on Performance Enhancement of Quartz Array Waveguide Diffraction Grating (AWG)*, Tokyo Institute of Technology, 2009, pp. 157.

International Search Report and Written Opinion dated Apr. 2, 2019, issued in PCT Application No. PCT/JP2019/008281, filed Mar. 4, 2019.

VARIABLE WAVELENGTH FILTER

TECHNICAL FIELD

The present invention relates to a variable wavelength filter used in a wavelength division multiplexing optical network.

BACKGROUND ART

Optical communications have increased in capacity and the transmission capacity has been increasing owing to wavelength-division multiplexing (WDM) systems. In particular, reconfigurable optical add-drop multiplexer (ROADM) systems have been introduced to implement channel switching at nodes. In the ROADM system, a ring or mesh network allows add/drop of optical signals at each node and lets optical signals that are not required to be added or dropped pass through nodes. This system dispenses with photoelectric conversion and hence advantageously contributes to reductions in node device size and power consumption. The future development of such ROADM systems requires devices that monitor the intensity of optical signals coming from different directions on a wavelength by wavelength basis, i.e., optical channel monitors (OCMs), as well as devices that monitor optical signal spectra, i.e., optical performance monitors (OPMs).

Proposed modes of implementation of OPMs and OCMs are as follows: (1) Using an optical tunable filter technology that enables rotation of a multilayer filter by a micro actuator to change the wavelength of optical signals passing through the filter, an OCM receives transmitted optical signals through a photodiode (PD) and detects the intensity of the signals (see Non-Patent Literature 1), (2) An OCM monitors wavelengths by channel through a plurality of PDs disposed at an output of an arrayed-waveguide grating (AWG) (see Non-Patent Literature 2), and (3) A wavelength tunable filter includes an AWG into which a resin having a refractive index with great dependence on temperature is inserted and performs its function by letting temperature of a part of the inserted resin change (see Non-Patent Literature 3).

CITATION LIST

Non-Patent Literature

Non-Patent Literature 1: "Optical Channel Monitor", [online], [searched on Dec. 5, 2017], website <http://www.optoplex.com/Optical_Channel_Monitor.htm>, Non-Patent Literature 2: "Optical Channel Monitor OCM", [online], [searched on Dec. 5, 2017], website <https://www.ntt-electronics.com/product/photonics/opt_c_m_ocm.html>, Non-Patent Literature 3: Takaharu Ohyama et al., "C-3-79 Wavelength tunable AWG for optical channel monitor", the 2008 Electronics Society Conference of the Institute of Electronics, Information and Communication Engineers, and Non-Patent Literature 4: Shin Kamei, "Performance improvement for quartz-based arrayed-waveguide grating", doctoral thesis at Tokyo Institute of Technology in 2009.

SUMMARY OF THE INVENTION

Technical Problem

Unfortunately, the conventional OCMs and OPMs have the following disadvantages. For instance, in the OCM disclosed in Non-Patent Literature 1, a mechanism for mechanically rotating the filter is complicated, resulting in an increased device size. In addition, a movable mechanical unit in the OCM is disadvantageous in view of reliability.

The OCM disclosed in Non-Patent Literature 2 has no movable mechanical unit but is disadvantageously unable to fulfill an OPM function for observing specific optical signal spectra.

In the OCM disclosed in Non-Patent Literature 3, the wavelength tunable filter changes wavelengths of transmitted optical signals to fulfill an OPM function for observing spectra of the signals. However, a range of the tunable wavelengths is small and is not large enough to measure an entire wavelength range of 1530 nm to 1565 nm.

In view of the problems described above, it is an object of the present invention to provide a variable wavelength filter having a wide variable wavelength range.

Means for Solving the Problem

To achieve the object above, a variable wavelength filter according to a first aspect of the present invention is provided. The variable wavelength filter includes, on a substrate, an input light waveguide, an arrayed-waveguide grating, and at least one output light waveguide. The arrayed-waveguide grating includes a first slab waveguide, two or more array waveguides, and a second slab waveguide. At least one of the first slab waveguide and the second slab waveguide includes a groove and a resin inserted into the groove. The variable wavelength filter includes temperature control means to heat or cool or heat and cool the substrate and temperature detection means to detect a temperature of the substrate.

In an embodiment, on condition that the groove intersects with a plurality of line segments A joining a place of connection between the input light waveguide and the first slab waveguide to places of connection between the respective array waveguides and the first slab waveguide, the groove is formed such that a total length LA of an intersection of the groove and each of the line segments A monotonously increases or decreases between the adjacent line segments A with a difference in the total length LA between the adjacent line segments A being constant.

In an embodiment, on condition that the groove intersects with a plurality of line segments B joining a place of connection between the at least one output light waveguide and the second slab waveguide to places of connection between the respective array waveguides and the second slab waveguide, the groove is formed such that a total length LB of an intersection of the groove and each of the line segments B monotonously increases or decreases between the adjacent line segments B with a difference in the total length LB between the adjacent line segments B being constant.

In an embodiment, the groove in each of the first and the second slab waveguides is formed such that the total length LA monotonously increases between the adjacent line segments A with a difference in the total length LA between the adjacent line segments A being constant and that the total length LB monotonously increases between the adjacent line segments B with a difference in the total length LB between the adjacent line segments B being constant or such that the total length LA monotonously decreases between the adjacent line segments A with a difference in the total length LA between the adjacent line segments A being constant and that the total length LB monotonously decreases between the adjacent line segments B with a difference in the total length LB between the adjacent line segments B being constant. Both the resin in the first slab waveguide and the resin in the second slab waveguide are heated or cooled by the temperature control means.

In an embodiment, the groove in each of the first and the second slab waveguides is formed such that the total length LA monotonously increases between the adjacent line segments A with a difference in the total length LA between the adjacent line segments A being constant and that the total length LB monotonously decreases between the adjacent line segments B with a difference in the total length LB between the adjacent line segments B being constant or such that the total length LA monotonously decreases between the adjacent line segments A with a difference in the total length LA between the adjacent line segments A being constant and that the total length LB monotonously increases between the adjacent line segments B with a difference in the total length LB between the adjacent line segments B being constant. The temperature control means is designed to cool the resin in the first slab waveguide and heat the resin in the second slab waveguide or to heat the resin in the first slab waveguide and cool the resin in the second slab waveguide.

In an embodiment, the variable wavelength filter further includes a 1×N optical switch disposed between the input light waveguide and the arrayed-waveguide grating and an M×1 optical switch disposed between the arrayed-waveguide grating and the at least one output light waveguide. The variable wavelength filter further includes at least one photodiode covering a variable wavelength range of the variable wavelength filter and receiving light emitted from a plurality of outputs of the arrayed-waveguide grating.

Effects of the Invention

The technique of the present invention described above makes it possible to provide a variable wavelength filter covering a wide wavelength range without a movable mechanical unit.

BRIEF DESCRIPTION OF DRAWINGS

FIG. 6 is a drawing for illustrating operation of a variable wavelength filter according to an embodiment of the present invention.

DESCRIPTION OF EMBODIMENTS

Embodiments of the present invention will now be described in detail with reference to the attached drawings. The embodiments described below are only illustrative and should not limit the scope of the present invention. Specific numerical values in the following description are provided for purposes of illustration, and the scope of the present invention should not be limited to these specific example numerical values but should include other numerical values without loss of generality. In the drawings, components having identical or similar functions are denoted by the same reference numerals or symbols, and redundant descriptions thereof are omitted.

First Embodiment

Figure 1A:
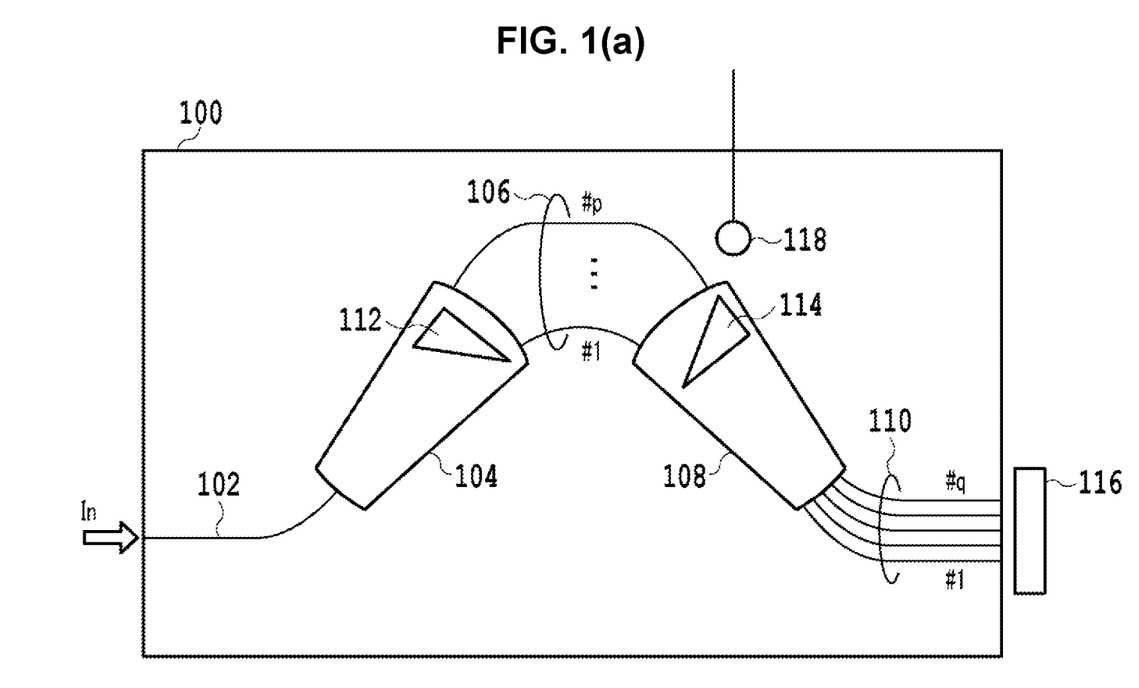
FIG. 1(a) is a top view and FIG. 1(b) is a side view, schematically showing a configuration of a variable wavelength filter according to an embodiment of the present invention.
Figure 1B:
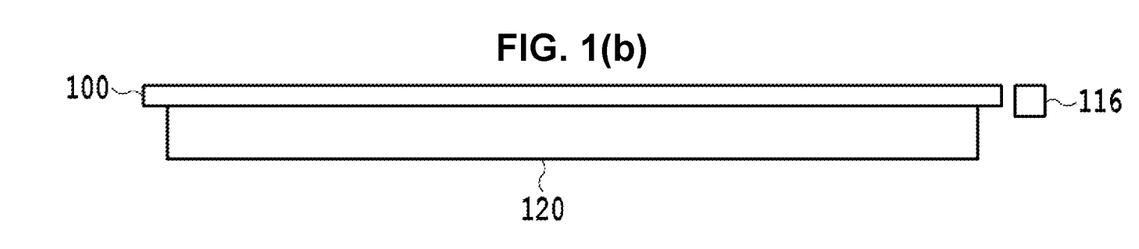

FIG. 1 is a schematic drawing showing a configuration of a variable wavelength filter according to a first embodiment of the present invention. FIG. 1(a) is a top view and FIG. 1(b) is a side view. As shown in FIG. 1(a), the variable wavelength filter includes an input light waveguide 102, a slab waveguide 104, array waveguides 106 #1 to 106 #p, a slab waveguide 108, and output light waveguides 110 #1 to 110 #q on an upper surface of a substrate 100. The slab waveguide 104, the array waveguides 106 #1 to 106 #p, and the slab waveguide 108 constitute an arrayed-waveguide grating. As shown in FIG. 1(b), the variable wavelength filter includes a temperature control element 120 on a lower surface of the substrate 100. FIG. 1 also shows a thermistor 118 used to measure temperature of the substrate 100. Further, FIG. 1 shows a photodiode array (PD array) 116 that receives light output from the output light waveguides 110 #1 to 110 #q of the variable wavelength filter.

FIG. 1 shows the variable wavelength filter including the two slab waveguides 104 and 108. Two resin grooves 112 and 114 disposed in the two slab waveguides 104 and 108 have widths (lengths in a direction of simplified light propagation) that, for example, change in an identical sign with an increase in array waveguide number (#1→#p). In other words, the widths of the grooves each increase along with an increase in array number. Of course the widths of the grooves may decrease along with an increase in array number.

The temperature control element 120 disposed on the lower surface of the substrate 100 is able to adjust wavelengths of light waves transmitted through the arrayed-waveguide grating by heating or cooling the overall substrate 100. A temperature coefficient of a refractive index of a resin in the resin grooves 112 and 114 is several tens of times higher than a temperature coefficient of quartz glass that is a component of the arrayed-waveguide grating. This allows the variable wavelength filter to have an expanded variable wavelength range.

Figure 3:
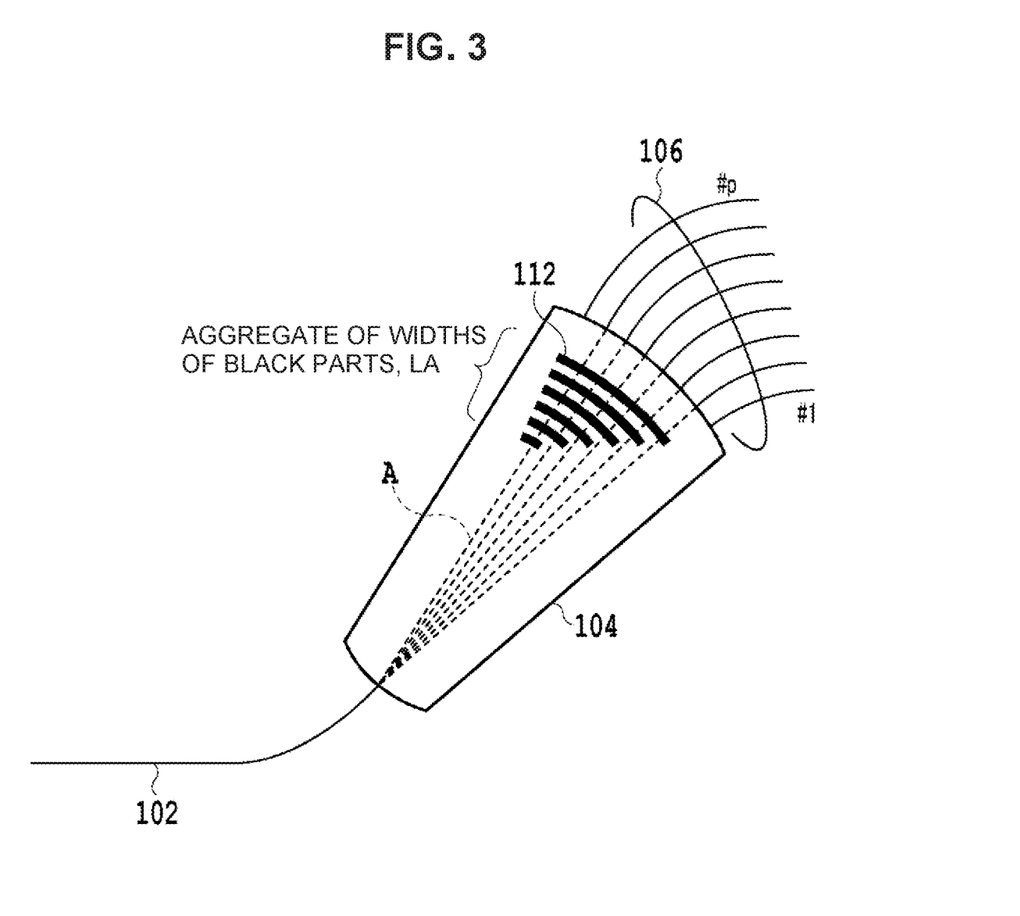
FIG. 3 is a drawing showing grooves into which a resin is inserted in an arrayed-waveguide grating.

A center wavelength $\lambda_0$ of the arrayed-waveguide grating is represented by the following formula:

$$\lambda_0 = \frac{1}{m}\left[\left(n_{g0} + \frac{dn_g}{dT}\Delta T\right)dL_g + \left(n_{r0} + \frac{dn_r}{dT}\Delta T\right)dL_r\right] \quad \text{Formula 1}$$

where ΔT is a change in temperature from a reference temperature, $n_{g0}$ is a refractive index of glass at the reference temperature, $dn_g/dT$ is a temperature coefficient of the refractive index of the glass, $dL_g$ is a difference in optical path length between the array waveguides, $n_{\gamma 0}$ is a refractive index of the resin at the reference temperature, $dn_\gamma/dT$ is a temperature coefficient of the refractive index of the resin, and $dL_\gamma$ is a difference in optical path length between portions of the groove, into which the resin is inserted, corresponding to the array waveguides. The difference in optical path length will be described later with reference to FIG. 3.

Generally, temperature dependence of the refractive index of the resin is several tens of times greater than that of glass. For instance, according to Non-Patent Literature 4, an absolute value of the temperature coefficient of the refractive index of the glass $dn_g/dT$ is $1\times10_{-5}$. An absolute value of the temperature coefficient of the refractive index of the resin $dn_\gamma/dT$ is $37\times10_{-5}$. A design example will be described below.

Figure 2:
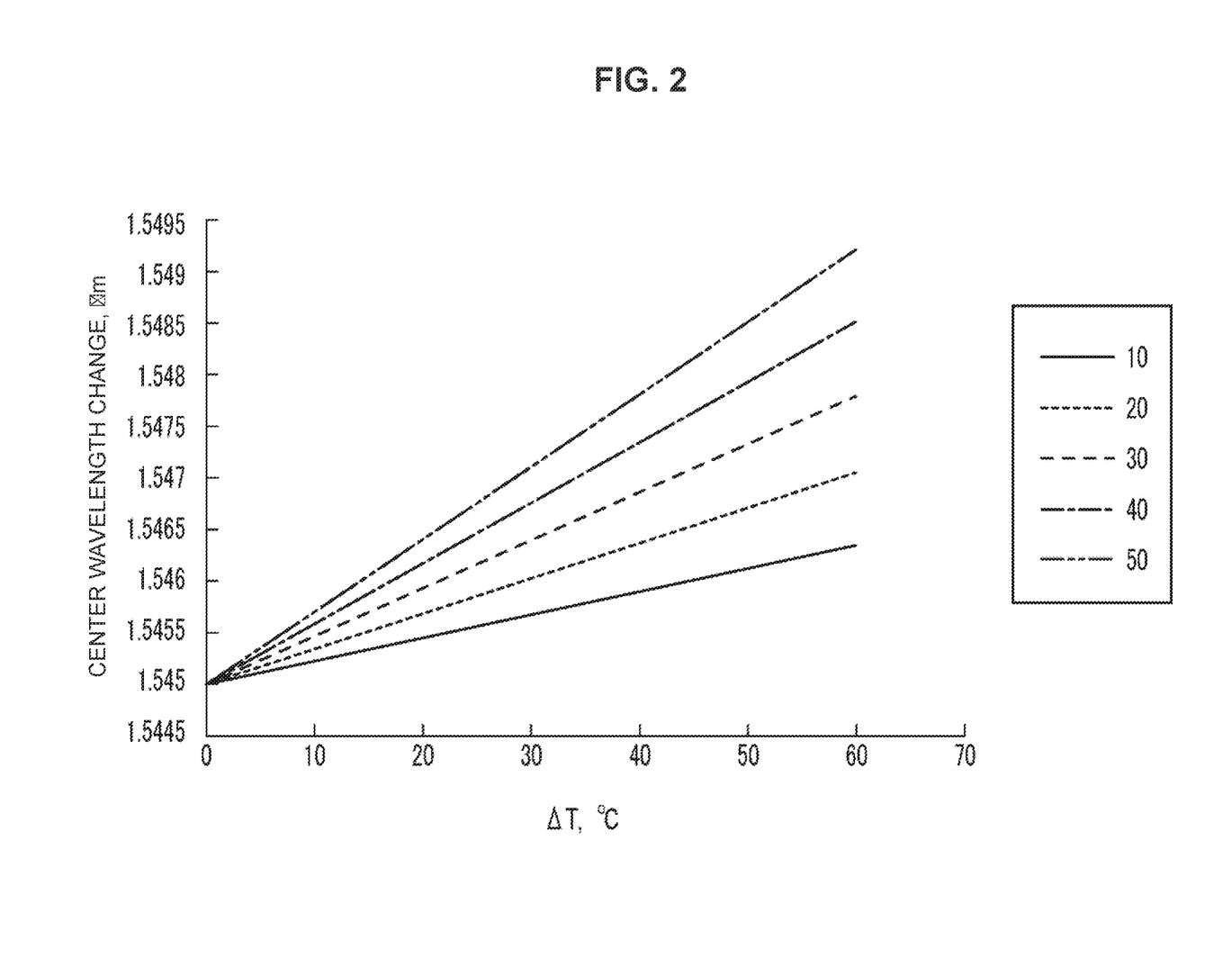
FIG. 2 is a graph showing relationships between substrate temperature and center wavelength for different rates of change in a resin groove width.

First, an ordinary arrayed-waveguide grating into which no resin is inserted is designed. To realize a variable wavelength filter that provides a center wavelength of 1545 nm at the reference temperature and that covers the entire C-band, a diffraction order m may be set to 23 and the optical path length difference between the array waveguides 106 may be 24.4 μm. Assuming that the resin groove 112 in the slab waveguide 104 and the resin groove 114 in the slab waveguide 108 are formed in an identical manner, FIG. 2 is a graph plotted to show relationships between the temperature of the substrate 100 and the center wavelength for different rates of change (equivalent to dL described above) in width of the total resin groove. In FIG. 2, in response to a degree of the formed resin grooves, the optical path length difference between the array waveguides 106 needs to be changed in a manner that may satisfy $dL_g=dL(n_{\gamma 0}/n_{g0})$. As shown in FIG. 2, the center wavelength changes along with a change in temperature.

The temperature control element (e.g., a heater) controls temperature under a constraint of an upper limit. For instance, on an assumption that the variable temperature range is up to 50° C. in FIG. 2, the center wavelength changes within a range of around 1.72 nm if the rate of change in the resin groove width is dL=20 μm. This does not enable the variable wavelength filter to cover the entire C-band. This is attributed to a factor similar to that disclosed in Non-Patent Literature 3. Thus, in order to serve as an optical performance monitor in particular, the variable wavelength filter preferably detects light intensity for every wavelength block with photodiodes (PDs) disposed at a plurality of the output light waveguides. Under the condition described above, 24 PDs may be disposed to cover a 40-nm range from 1530 nm to 1570 nm. In this case, a chip-scale packaged PD array containing 24 PDs may be disposed.

In the present embodiment, the temperature control element 120 may be a Peltier element instead of a heater.

The grooves (112, 114), into which the resin is inserted, let optical signals be discharged to outside an optical waveguide core, thus causing a loss. The resin grooves may be each divided into a plurality of grooves to reduce such a loss as known in a theory about athermal arrayed-waveguide gratings. This theory may be applied to the variable wavelength filter of the present invention. In applying the theory, of course a variable wavelength filter may be configured such that a sum of widths of divided grooves satisfies the requirements described above.

FIG. 3 is a schematic drawing showing a configuration of six divided resin grooves. In FIG. 3, the arrayed-waveguide grating has eight array waveguides (P=8) for convenience's sake, and the divided resin grooves increase one by one for line segments A joining the input light waveguide 102 to the array waveguides 106 #1 to 106 #p with an increase in array waveguide number, for example. In this example, all the resin grooves are equal in width. In the description given herein, the width of the resin groove is a length in the direction of simplified light propagation.

As described above, in the present embodiment, the widths of the grooves increase in an identical sign along with an increase in array number. The optical path length difference $dL_\gamma$ also increases in an identical sign along with an increase in array number. As shown in FIG. 3, the line segments A are a plurality of line segments joining a place of connection between the input light waveguide 102 and the slab waveguide 104 to places of connection between the array waveguides (106-#1 to #p) and the slab waveguide 104. A difference between a total length (an aggregate length) $LA_{106-\#1}$ of an intersection of a line segment $A_{106-\#1}$ corresponding to the array waveguide 106-#1 and resin grooves 112 and a total length (an aggregate length) $LA_{106-\#2}$ of intersections of a line segment $A_{106-\#2}$ corresponding to the array waveguide 106-#2 and the resin grooves 112 is the optical path length difference $dL_\gamma$. A difference between the total length $LA_{106-\#2}$ of the intersections of the line segment $A_{106-\#2}$ corresponding to the array waveguide 106-#2 and the resin grooves 112 and a total length $LA_{106-\#3}$ of intersections of a line segment $A_{106-\#3}$ corresponding to the array waveguide 106-#3 and the resin grooves 112 is also the optical path length difference $dL_\gamma$. Likewise, a difference between a total length $LA_{106-\#p-1}$ for the array waveguide 106-#p−1 and a total length $LA_{106-\#3}$ for the array waveguide 106-#p is the optical path length difference $dL_\gamma$. This similarly applies to the slab waveguide 108. A plurality of line segments joining places of connection between the output light waveguides 110 #1 to 110 #q and the slab waveguide 108 to places of connection between the array waveguides (106-#1 to #p) and the slab waveguide 108 is line segments B. For the output light waveguide 110 #1, a difference between a total length $LB_{106-\#1}$ of an intersection of a line segment $B_{106-\#1}$ corresponding to the array waveguide 106-#1 and resin grooves 114 and a total length $LB_{106-\#2}$ of intersections of a line segment $B_{106-\#2}$ corresponding to the array waveguide 106-#2 and the resin grooves 114 is the optical path length difference $dL_\gamma$. A difference between the total length $LB_{106-\#2}$ of the intersections of the line segment $B_{106-\#2}$ corresponding to the array waveguide 106-#2 and the resin grooves 114 and a total length $LB_{106-\#3}$ of intersections of a line segment $B_{106-\#3}$ corresponding to the array waveguide 106-#3 and the resin grooves 114 is also the optical path length difference $dL_\gamma$. Likewise, a difference between a total length $LB_{106-\#p-1}$ for the array waveguide 106-#p−1 and a total length $LB_{106-\#3}$ for the array waveguide 106-#p is the optical path length difference $dL_\gamma$. This similarly applies to the output light waveguides 110 #2 to 110 #q. If the resin grooves 112 and 114 are each made up of a plurality of divided grooves as shown in FIG. 3, the LA and LB are aggregate lengths of portions of intersections of the line segments A and B and the resin grooves 112 and 114 respectively. However, if the grooves are each made up of a single wedge-shaped groove, the LA and LB are lengths of intersections of the line segments A and B and the resin grooves 112 and 114 respectively.

In the present embodiment, the variable wavelength range can be expanded by letting the temperature control element 120 heat or cool both the resin groove 112 in the slab waveguide 104 and the resin groove 114 in the slab waveguide 108.

Second Embodiment

Figure 4A:
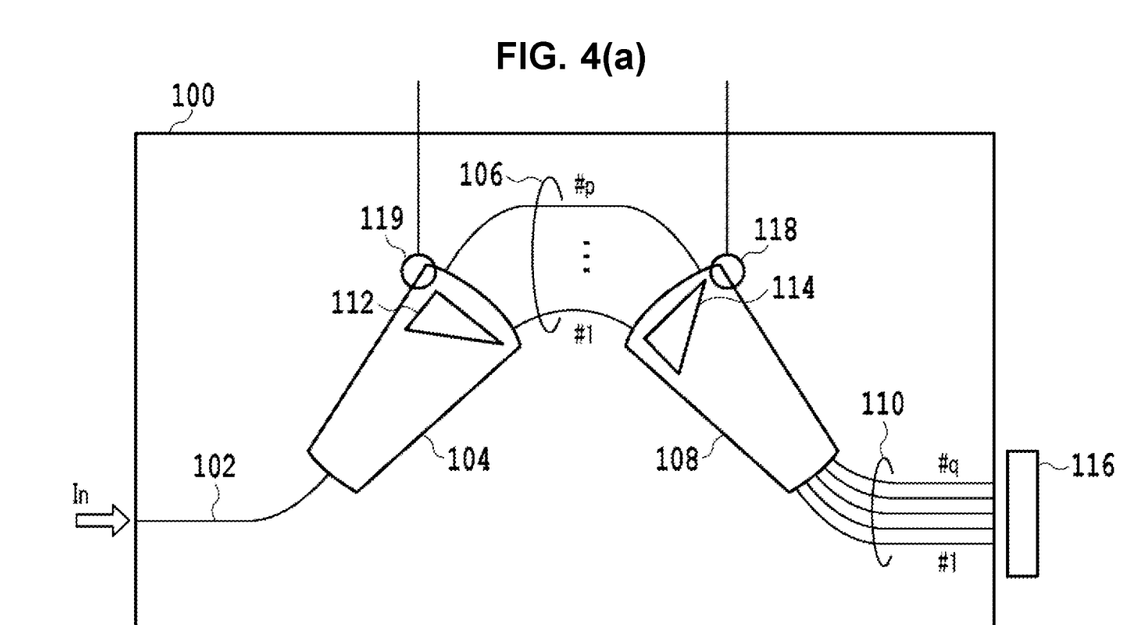
FIG. 4(a) is a top view and FIG. 4(b) is a side view, schematically showing a configuration of a variable wavelength filter according to an embodiment of the present invention.
Figure 4B:
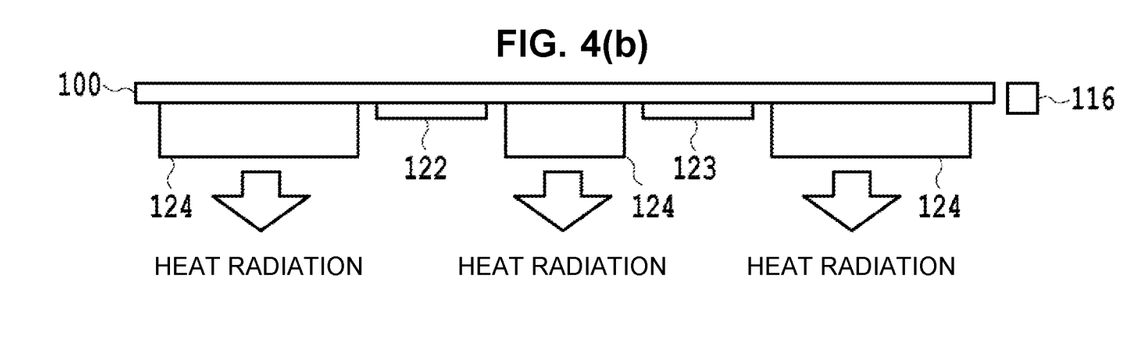

FIG. 4 is a schematic drawing showing a configuration of a variable wavelength filter according to a second embodiment of the present invention. FIG. 4(a) is a top view and FIG. 4(b) is a side view. In the variable wavelength filter exemplified in FIG. 4, two resin grooves 112 and 114 disposed in two slab waveguides 104 and 108 have respective widths, and one of the widths increases and the other width decreases with an increase in array waveguide number (#1→#p), for example. In other words, along with an increase in array number, the width of the resin groove 112 in the slab waveguide 104 increases and the width of the resin groove 114 in the slab waveguide 108 decreases.

Generally, heater elements are superior in cost performance to Peltier elements. In the present embodiment, the variable wavelength filter is able to change the center wavelength to longer or shorter wavelengths by selectively heating the resin in one of the grooves. In this case, thermistors (118, 119) used to monitor temperature are disposed so as to selectively monitor respective zones of the resin grooves (114, 112). In addition, individual heaters (122, 123) are disposed directly beneath the resin grooves (114, 112), and a heat radiation mechanism (124) such as radiator fins is provided to avoid influence of heat intended for one of the resins on the other resin. Preferably, the thermistors (118, 119) are disposed at places away from the radiator fins to accurately measure temperatures of the resin in the resin grooves (114, 112).

In the present embodiment, the wavelength range can be tuned by letting the heater 122 heat the resin groove 112 in the slab waveguide 104 or letting the heater 123 heat the resin groove 114 in the slab waveguide 108.

Peltier elements may be used instead of the heaters to broaden the variable range. In other words, the heaters (122, 123) can be replaced with Peltier elements to expand the variable range. In this case, the variable range can be expanded by letting a first Peltier element 122 heat the resin groove 112 in the slab waveguide 104 and letting a second Peltier element 123 cool the resin groove 114 in the slab waveguide 108. Alternatively, the variable range can be expanded by letting the first Peltier element 122 cool the resin groove 112 in the slab waveguide 104 and letting the second Peltier element 123 heat the resin groove 114 in the slab waveguide 108.

Third Embodiment

A wavelength range that can be controlled by variable wavelength filters according to the first and second embodiments is limited to only a range of several nanometers. This requires any of the wavelength filters used as an OPM to include a plurality of PDs to measure optical signal spectra for every wavelength block. In other words, the variable wavelength filters according to the first and second embodiments need pluralities of PDs, and impedance conversion amplifies and logarithmic amplifies immediately downstream of the PDs. A third embodiment provides a variable wavelength filter that solves this challenge.

Figure 5A:
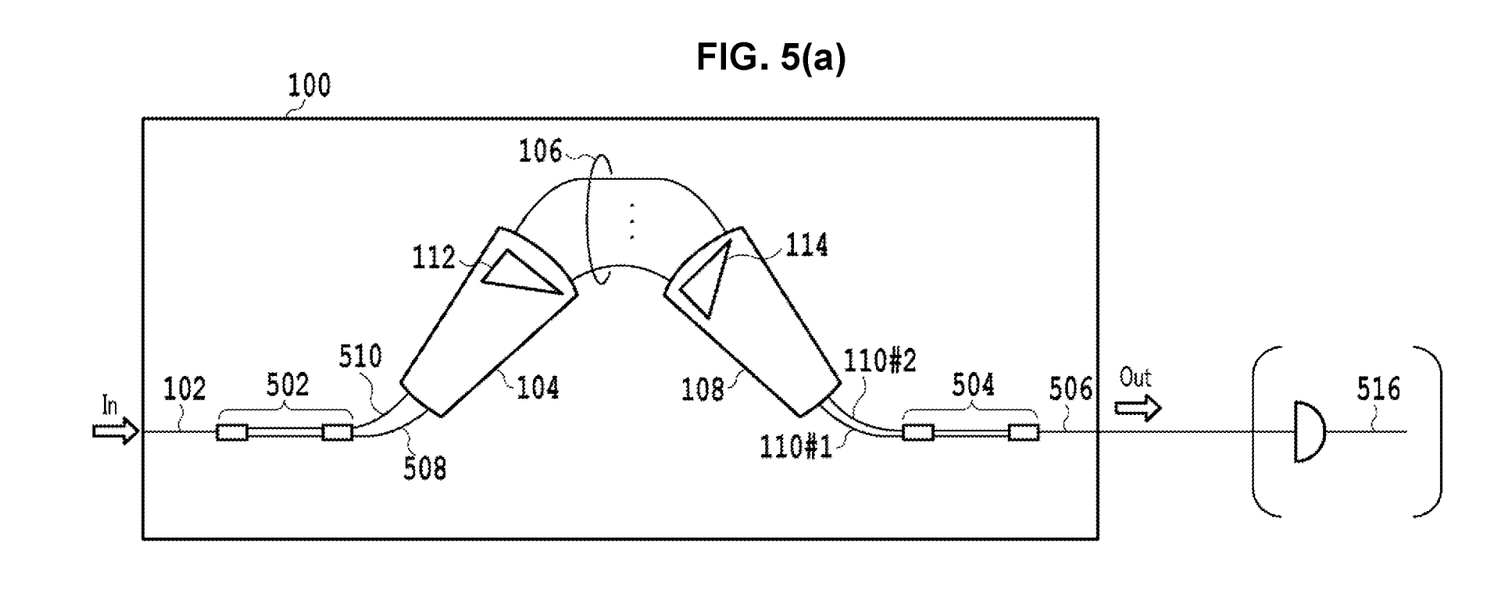
FIG. 5(a) is a top view and FIG. 5(b) is a side view, schematically showing a configuration of a variable wavelength filter according to an embodiment of the present invention.
Figure 5B:
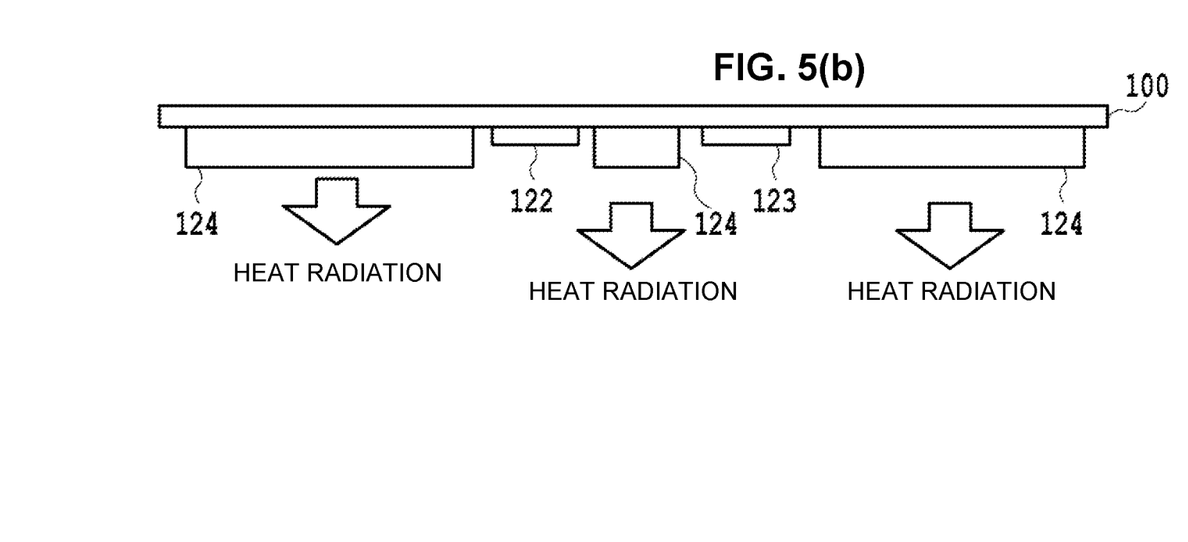

FIG. 5 is a schematic drawing showing a configuration of a variable wavelength filter according to the third embodiment of the present invention. FIG. 5(a) is a top view and FIG. 5(b) is a side view. The variable wavelength filter exemplified in FIG. 5 includes an input light waveguide 102, a slab waveguide 104, array waveguides 106 #1 to 106 #p, a slab waveguide 108, and an output light waveguide 506 on an upper surface of a substrate 100. The slab waveguide 104, the array waveguides 106 #1 to 106 #p, and the slab waveguide 108 constitute an arrayed-waveguide grating. The variable wavelength filter includes thermistors 118 and 119 (not shown) to measure temperature of the substrate 100. As shown in FIG. 5(b), individual heaters (122, 123) are disposed on a lower surface of the substrate 100 and directly beneath resin grooves (112, 114). A heat radiation mechanism (124) such as radiator fins is provided to avoid influence of heat intended for one of the resins on the other resin. Further, FIG. 5(a) shows a photodiode 516 that receives light output from the output light waveguide 506.

In the variable wavelength filter of this embodiment, in a similar way to the variable wavelength filter shown in FIG. 4, two resin grooves 112 and 114 disposed in two slab waveguides 104 and 108 have respective widths, and one of the widths increases and the other width decreases with an increase in array waveguide number (#1→#p). In other words, along with an increase in array number, the width of the resin groove 112 in the slab waveguide 104 increases and the width of the resin groove 114 in the slab waveguide 108 decreases.

In the present embodiment, in a similar way to the variable wavelength filter shown in FIG. 4, the wavelength range can be tuned by letting the heater 122 heat the resin groove 112 in the slab waveguide 104 or letting the heater 123 heat the resin groove 114 in the slab waveguide 108.

In a similar way to the variable wavelength filter shown in FIG. 4, Peltier elements may be used instead of the heaters to broaden the variable range. In other words, the heaters (122, 123) can be replaced with Peltier elements to expand the variable range. In this case, the variable range can be expanded by letting a first Peltier element 122 heat the resin groove 112 in the slab waveguide 104 and letting a second Peltier element 123 cool the resin groove 114 in the slab waveguide 108. Alternatively, the variable range can be expanded by letting the first Peltier element 122 cool the resin groove 112 in the slab waveguide 104 and letting the second Peltier element 123 heat the resin groove 114 in the slab waveguide 108.

In the variable wavelength filter shown in FIG. 5, a 1×2 (1 input and 2 output ports) optical switch 502 is disposed at an input of the arrayed-waveguide grating to switch optical signals coming from the input light waveguide 102 to an input light waveguide 508 (InA) or an input light waveguide 510 (InB). Similarly, a 2×1 (2 input and 1 output ports) optical switch 504 is disposed at an output of the arrayed-waveguide grating to switch optical signals coming from either an output light waveguide 110 #2 (OutA) or an output light waveguide 110 #1 (OutB) to the output light waveguide 506. A ratio of a space between points of the slab waveguide 104 to which InA and InB are connected to a space between points of the slab waveguide 108 to which OutA and OutB are connected is set to 2:1.

In this example, the ratio is set to 2:1 for convenience. However, any ratio may be set. The variable wavelength filter includes 1×2 and 2×1 optical switches. However, optical switches having more ports (1×N optical switch, M×1 optical switch, where N, M are integers greater than or equal to 2) may be used to have an expanded wavelength cover range described later. Alternatively, a necessary temperature variable range may be set to a narrow range to contribute to reduced power consumption and increased reliability.

Figure 6A:
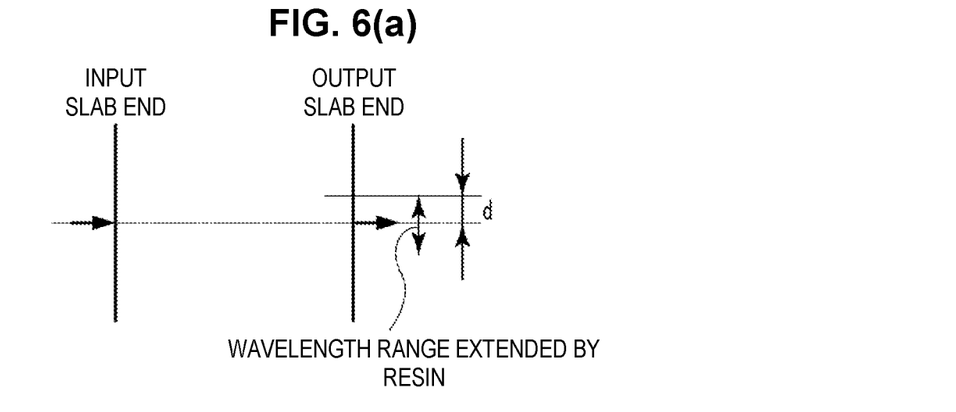
FIG. 6(a) illustrates operation of variable wavelength filters described in a first and a second embodiments and FIGS. 6(b) and 6(c) illustrate operation of a variable wavelength filter described in a third embodiment.

With reference to FIG. 6, operation of a variable wavelength filter according to an embodiment of the present invention will now be described. FIG. 6(a) illustrates operation performed by the variable wavelength filters described in the first and second embodiments at a central output port. In general, optical signals input into an input slab (the slab waveguide 104) are input through a center of an end of the slab. In this case, a center wavelength λc at a reference temperature shifts within a range indicated with an arrow. As a result, the wavelengths of optical signals output from an output slab (the slab waveguide 108) are wavelengths of optical signals that appear in a position of the arrow, and optical signals of these wavelengths are output from the output slab. In other words, this arrow represents a wavelength variable range Δλ depending on a temperature change.

Figure 6B:
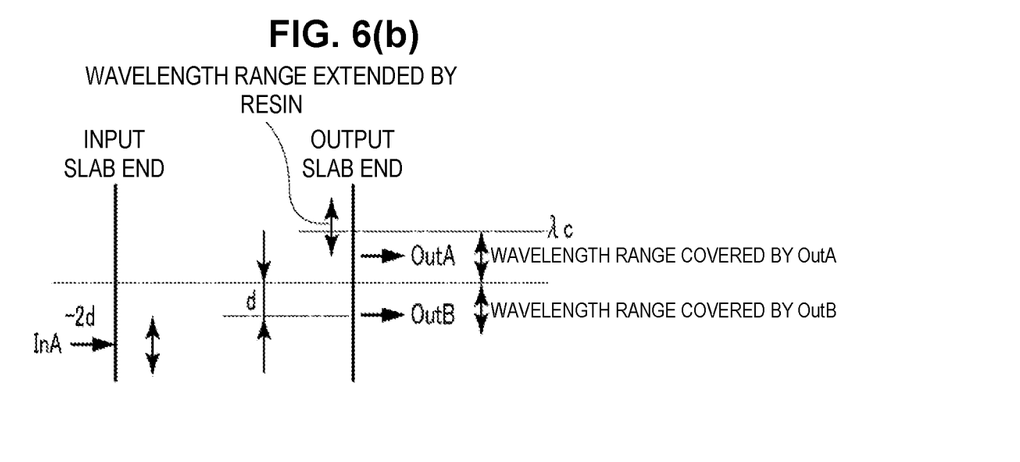
Figure 6C:
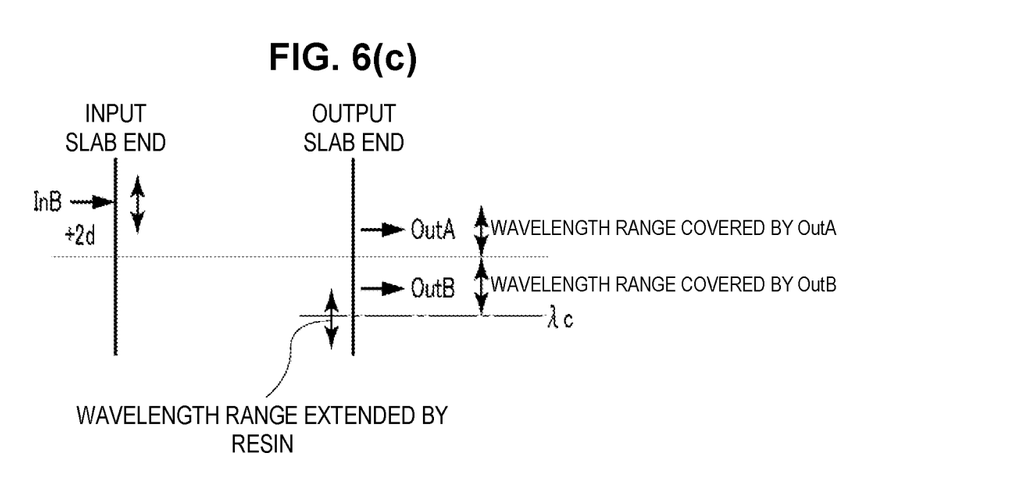

FIGS. 6(b) and 6(c) are drawings illustrating operation of the variable wavelength filter described in the present embodiment. As shown in FIG. 6(b), if the input-side 1×2 switch 502 switches optical signals to the input light waveguide 508 and the optical signals are input via InA connected to a place on a slab end shifted −2d (at a distance of 2d) from a center of the slab end, a center wavelength λc moves to a place shown in the figure. Then, if two outputs OutA (the output light waveguide 110-#2) and OutB (the output light waveguide 110-#1) are disposed at places on a slab end shifted +d, −d (at a distance of d) from a center of the slab end as shown in the figure, a zone of wavelengths of the optical signals output via the outputs covers a zone twice an original wavelength range Δλ. The output-side 2×1 switch allows selection between signals from OutA and OutB.

FIG. 6(c) illustrates a case in which the input-side 1×2 switch 502 switches optical signals to the input light waveguide 510 and the optical signals are input via InB connected to a place on the slab end shifted +2d (at a distance of 2d) from the center of the slab end. In this case, a range of wavelengths of the optical signals output into OutA and OutB is 2Δλ in a similar way to the instance in FIG. 6(b) and is, however, a wavelength range on an opposite side of the center wavelength λc from that in FIG. 6(b).

Thus, the variable wavelength filter of the present embodiment is able to cover a wavelength range four times the variable center wavelength width depending on a temperature change.

Figure 7:
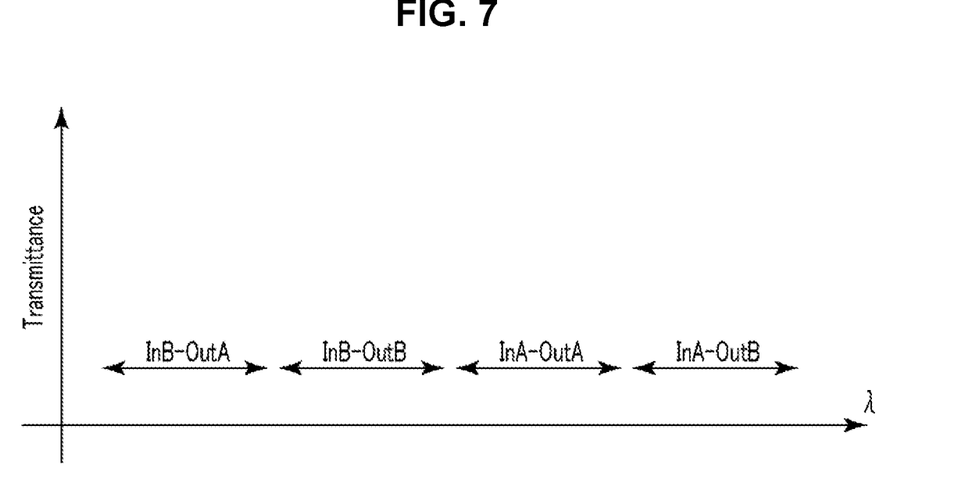
FIG. 7 is a drawing showing a relationship between a covered center wavelength range and combinations of input and output waveguides for an arrayed-waveguide grating of a variable wavelength filter according to an embodiment of the present invention.

FIG. 7 is a drawing showing a relationship between a covered center wavelength range and combinations of InA, InB, OutA, and OutB of the variable wavelength filter according to the present embodiment.

In the present embodiment described above, one 1×2 switch 502 is disposed on the input side and one 2×1 switch 504 is disposed on the output side, for example. A 4×1 optical switch may be disposed on the output side, for example, to cover a broader wavelength range. For instance, OutC and OutD may be additionally disposed below OutB in a lower part of FIG. 6(b), and OutE and OutF may be disposed in an upper part of FIG. 6(c).

REFERENCE SIGNS LIST 100 substrate
102 input light waveguide
104 slab waveguide
106 array waveguide (#1 to #p)
108 slab waveguide
110 output light waveguide (#1 to #q)
112 groove (resin groove)
114 groove (resin groove)
116 photodiode array (chip-scale packaged PD array)
118 thermistor
119 thermistor
120 temperature control element
122 heater
124 heat radiation mechanism (radiator fin)
502 1×2 switch (optical tap)
504 2×1 switch
506 output light waveguide
508 input light waveguide
510 input light waveguide
516 photodiode

The invention claimed is:

1. A variable wavelength filter comprising: on a substrate, an input light waveguide;
an arrayed-waveguide grating including a first slab waveguide, two or more array waveguides, and a second slab waveguide; and
at least one output light waveguide,
wherein at least one of the first slab waveguide and the second slab waveguide includes a groove and a resin inserted into the groove,
wherein the groove is formed:
such that, on condition that the groove intersects with a plurality of line segments A joining a place of connection between the input light waveguide and the first slab waveguide to places of connection between the respective array waveguides and the first slab waveguide, a total length LA of an intersection of the groove and each of the line segments A monotonously increases or decreases between the adjacent line segments A with a difference in the total length LA between the adjacent line segments A being constant, or
such that, on condition that the groove intersects with a plurality of line segments B joining a place of connection between the at least one output light waveguide and the second slab waveguide to places of connection between the respective array waveguides and the second slab waveguide, a total length LB of an intersection of the groove and each of the line segments B monotonously increases or decreases between the adjacent line segments B with a difference in the total length LB between the adjacent line segments B being constant, and
wherein the variable wavelength filter includes temperature control means to heat or cool or heat and cool the substrate and temperature detection means to detect a temperature of the substrate.

2. The variable wavelength filter according to claim 1, wherein the first slab waveguide and the second slab waveguide each include the groove and the resin inserted into the groove,
wherein the groove in each of the first and the second slab waveguides is formed such that the total length LA monotonously increases between the adjacent line segments A with a difference in the total length LA between the adjacent line segments A being constant and that the total length LB monotonously increases between the adjacent line segments B with a difference in the total length LB between the adjacent line segments B being constant or such that the total length LA monotonously decreases between the adjacent line segments A with a difference in the total length LA between the adjacent line segments A being constant and that the total length LB monotonously decreases between the adjacent line segments B with a difference in the total length LB between the adjacent line segments B being constant, and wherein both the resin in the first slab waveguide and the resin in the second slab waveguide are heated or cooled by the temperature control means.

3. The variable wavelength filter according to either claim 2, further comprising:

a 1×N optical switch, where N is an integer greater than or equal to 2, the 1×N optical switch being disposed between the input light waveguide and the arrayed-waveguide grating; and an M×1 optical switch, where M is an integer greater than or equal to 2, the M×1 optical switch being disposed between the arrayed-waveguide grating and the at least one output light waveguide.

4. The variable wavelength filter according to claim 3, further comprising at least one photodiode covering a variable wavelength range of the variable wavelength filter and receiving light emitted from a plurality of outputs of the arrayed-waveguide grating.

5. The variable wavelength filter according to claim 2, further comprising at least one photodiode covering a variable wavelength range of the variable wavelength filter and receiving light emitted from a plurality of outputs of the arrayed-waveguide grating.

6. The variable wavelength filter according to claim 1, wherein the first slab waveguide and the second slab waveguide each include the groove and the resin inserted into the groove, wherein the groove in each of the first and the second slab waveguides is formed such that the total length LA monotonously increases between the adjacent line segments A with a difference in the total length LA between the adjacent line segments A being constant and that the total length LB monotonously decreases between the adjacent line segments B with a difference in the total length LB between the adjacent line segments B being constant or such that the total length LA monotonously decreases between the adjacent line segments A with a difference in the total length LA between the adjacent line segments A being constant and that the total length LB monotonously increases between the adjacent line segments B with a difference in the total length LB between the adjacent line segments B being constant, and wherein the temperature control means is designed to cool the resin in the first slab waveguide and heat the resin in the second slab waveguide or to heat the resin in the first slab waveguide and cool the resin in the second slab waveguide.

7. The variable wavelength filter according to either claim 6, further comprising:

a 1×N optical switch, where N is an integer greater than or equal to 2, the 1×N optical switch being disposed between the input light waveguide and the arrayed-waveguide grating; and an M×1 optical switch, where M is an integer greater than or equal to 2, the M×1 optical switch being disposed between the arrayed-waveguide grating and the at least one output light waveguide.

8. The variable wavelength filter according to claim 6, further comprising at least one photodiode covering a variable wavelength range of the variable wavelength filter and receiving light emitted from a plurality of outputs of the arrayed-waveguide grating.

9. The variable wavelength filter according to claim 1, wherein the temperature control means comprises:

one of a heating mechanism and a heating-cooling mechanism to individually heat the resin inserted in the groove or to individually heat or cool the inserted resin; and a heat radiation mechanism to let heat radiated from a part of the variable wavelength filter other than the groove in which the heated or cooled resin is inserted.

10. The variable wavelength filter according to claim 9, wherein one of the heating mechanism and the heating-cooling mechanism is disposed in a zone directly below each of the grooves in which the resin is inserted, and wherein the heat radiation mechanism is disposed in a zone on the substrate so as to thermally isolate the heated or cooled resin.

11. The variable wavelength filter according to claim 1, further comprising temperature measurement means designed to individually measure a temperature of the resin inserted in the groove.

* * * * *